United States Patent Office 2,881,620
Patented Apr. 14, 1959

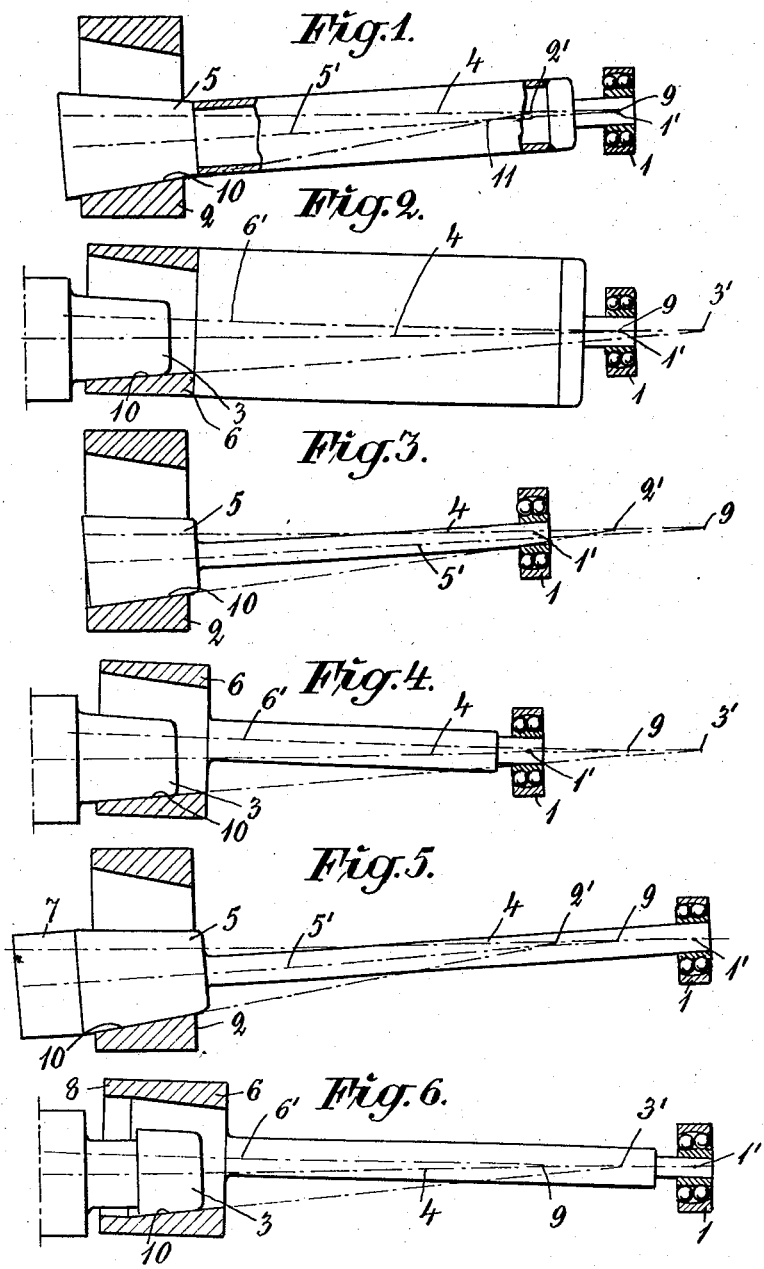

2,881,620
ARRANGEMENT IN PENDULUM VIBRATORS

Sven-Åke Nordegren, Stockholm, Sweden, assignor to Vibro-Plus Corporation, Woodside, N.Y., a corporation of Delaware Application February 23, 1955, Serial No. 490,055

Claims priority, application Sweden February 23, 1954

2 Claims. (Cl. 74—87)

This invention relates to vibrators of the kind which operate in principle as conical pendulums and comprise a roller body which is primarily set in rotation around its own axis by a driving device and is mounted close to one end of a more or less flexible pendulum shaft the other end of which is carried in a bearing, which possibly permits universal articulation of the shaft and which is rigidly connected to a roller track coaxial with the bearing against which track the roller body is adapted to roll in dependence upon its own rotation during the operation of the vibrator. One form of construction for vibrators of this type is described in U.S. Patent No. 2,194,410 but also other forms of the pendulum vibrator defined in the introduction come into consideration, such as types in which the pendulum shaft is at least partially flexible and is rotatably mounted at its end remote from the roller body in a bearing which does not allow angular deviations, so that the movement of the conical pendulum presupposes a deflection of the pendulum shaft.

It is obvious that for the production of an effective vibrator, the actual principle of the conical pendulum demands that under operating conditions the pendulum shall oscillate around a substantially constant point which ought to be located on the common central axis of the roller track and the bearing. However, it is of course not quite necessary that the point of oscillation of the pendulum coincides with the point around which the bearing allows angular deviation in the cases concerned—in practice this is only the case in certain very complicated vibrator designs of the said type. In principle, a distinction can be drawn between three different cases: in the first case the pendulum shaft is entirely rigid so that the point of oscillation of the pendulum fully coincides with the centre of angular deviation in the bearing; in the second case the point of oscillation of the pendulum will lie outside the bearing (reckoned from the roller body) on account of the dynamic deflection of the pendulum shaft which in this case is not compensated; in the third case the theoretical point of oscillation of the pendulum shaft will lie inside the bearing, either on account of the fact that the pendulum shaft is relatively rigid while at the same time the bearing does not allow angular deviation, or owing to the fact that special measures have been taken for the purpose of eliminating, entirely or for the greater part, a dynamic deflection of the shaft of the pendulum, for example by means of supporting roller bodies and supporting roller tracks (see U.S. Patent No. 2,546,806) or by increasing the mass of the part cooperating with the roller track outside the roller body.

Already at an early stage in the development of pendulum vibrators with which the invention is concerned it was found desirable to shape both the roller track and the part of the roller body cooperating with the roller track in a substantially conical form and with a decreasing diameter in the direction towards the bearing. The fact that it was desirable to obtain a uniform gear ratio at axially separated points between the roller body and the roller track rendered it theoretically necessary that the cone vertex of both the roller body and the roller track should coincide with the imaginary point around which the pendulum oscillated during the operation of the vibrator and this oscillation point is, of course, the same as the point of intersection between the central axis of the roller track and that of the roller body under the existing dynamic conditions. Much work has been done in connection with the designing of the pendulum vibrators to permit the exact determination of the imaginary oscillation point of the pendulum in order to enable the theoretically correct shape of the roller body and roller track to be produced, and success has been achieved in this respect. For this purpose it has been necessary to give careful consideration both to the elastic deformation in the roller body and the roller track, and the deflection of the pendulum shaft has, of course, called for special attention. The application of the theories in actual practice naturally presupposes very small tolerances which nevertheless can and must be adhered to by those skilled in the art in order to achieve a high quality in the vibrators produced.

Particularly where pendulum vibrators with a high centrifugal force, frequency and amplitude are concerned it has been found that the development indicated above has resulted in the fact that the most sensitive feature in the vibrator is no longer the correct cooperation between the roller body and the roller track but instead the bearing support of the pendulum shaft. As will be readily understood, a high degree of dynamic deflection in the pendulum shaft will produce a radial load on the bearing, and a radial load of this kind will, of course, always exist in practice owing to the unbalanced oscillation of the pendulum. These radial loads can be compensated to a great extent, however, as described in U.S. Patent No. 2,437,983 and this is also preferably done in practice; actually, however, small radial loads are of no significance since in the first place the bearing for the pendulum shaft must always take the form of a radial bearing. On the other hand, a bearing of this kind possesses only a limited capacity for taking up axial loads and investigations have shown that an axial force in a spherical ball bearing, for example, which is very frequently employed for vibrators of the type here in question, will wear the bearing to approximately double the extent (1.5–2.5 times) of a radial force of the same intensity. This implies that the life of the bearing is dependent to a great extent upon the axial load and it must therefore be regarded as essential that the axial stresses in the pendulum bearing of the vibrator must be kept as low as possible, irrespective of whether the latter is of the type allowing angular deviation or not.

The axial stresses in the bearing for the type of vibrators to which the invention relates are, of course, primarily dependent upon the conical shape of the roller body and roller track. The vibrations are generated by the roller body which is pressed with considerable force against the roller track at a constantly changing point, and since the opposing force of the roller track is directed at right-angles to the surface at which the roller body and roller track are in contact with one another at any moment it is obvious that in view of the conical form of the roller track, an axially directed power component will also be set up, the magnitude of which, apart from the fact that it is naturally directly dependent on the contact pressure, is also dependent upon the conical angle of the roller track. This implies that the axial forces will increase as the centrifugal force increases. On the other hand, the direction of the axial force will, of course, depend entirely upon whether an external or an internal roller track is employed, that is to say, whether the roller track surrounds the roller body or vice versa. With an external roller track the axial force is directed from the bearing towards the roller body, whereas with an internal roller track it is directed from the roller body towards the bearing. The problem is similar in both cases, however.

The present invention has for its purpose to produce an arrangement in pendulum vibrators of the type referred to above, which substantially eliminates the axial forces set up in the bearing, and the feature characterizing the arrangement according to the invention resides in the fact that the roller track, the roller body and the pendulum shaft are so constructed in relation to one another that during the normal operation of the vibrator and the consequent elastic deformation of the roller body and roller track and the dynamic deflection of the pendulum shaft set up, the roller body and roller track will make contact with one another along a line which intersects the common axis of the roller track and bearing at a point which is axially displaced in the same direction as that in which the axial forces in the bearing, due to the conical form of the roller track and roller body, are set up in relation to the point at which the rotary shaft of the roller body intersects the common axis of the roller track and bearing during the normal working conditions prevailing, so that a twisting tendency is produced in the roller body to eliminate the said axial force entirely or in part owing to the variation in the gear ratio between the roller body and the roller track at axially separated points along the line of contact.

In other words, this implies a controlled deviation from the previously mentioned theoretically correct shape of the roller track and roller body in a given direction, and although this may be regarded as a deviation from the correct shaping of the roller body and roller track from a theoretical view point, it has been clearly demonstrated in practice that the deviation does not entail any or only such a slight disadvantage that the latter is more than satisfactorily compensated by the appreciable advantages obtained in the bearing. Those skilled in the art undoubtedly possess the ability at the present day to determine, both theoretically and by practical investigation, whether conditions exist for the application of the present invention and must, of course, thereby also take into account such conditions as the elastic deformation of the material employed in the vibrator and the dynamic forces set up in different parts of the vibrator under normal service.

To elucidate the invention some examples of its application which are only diagrammatic will hereinafter be more particularly described.

In the drawings Fig. 1 is a pendulum vibrator according to the invention with an external roller track, a rigid pendulum shaft and a pendulum bearing allowing angular deviation, while Fig. 2 shows a corresponding vibrator with an internal roller track. Fig. 3 shows a pendulum vibrator with a flexible pendulum shaft, an external roller track and a bearing allowing angular deviation, while Fig. 4 is a vibrator corresponding to the one in Fig. 3 with an internal roller track. Fig. 5 shows a vibrator with a flexible pendulum shaft, an external roller track, a bearing allowing angular deviation and a roller body extension reducing the angular deviation in the bearing, while Fig. 6 illustrates a vibrator corresponding to the one in Fig. 5 but equipped with an internal roller track.

From the examples shown, those according to Fig. 3 and 4 are the types most commonly occurring in practice since a pendulum shaft can never be made so rigid that it is not subjected to dynamic deflection in vibrators with larger outputs at least. By a suitable combination of a practically rigid tubular pendulum shaft and a roller body extension similar to that shown in Figs. 5 or 6, a vibrator can, however, meet the demands made on a theoretically rigid shaft of the form assumed in the diagrammatic Figs. 1 and 2. By using a flexible pendulum shaft with supporting rollers, working conditions are obtained in the vibrator which are to some extent reminiscent of the types illustrated in Figs. 5 and 6 and if the pendulum shaft is flexible while at the same time the bearing is of such a type that it does not allow angular deviations, approximately similar conditions are obtained, inasmuch as the oscillation point of the pendulum is moved inwards from the bearing towards the roller body, but usually also slightly outwards again on account of the dynamic deflection of the pendulum shaft, particularly when the pendulum shaft is long or in other words, the pendulum will more or less assume an S-bend while the vibrator is working.

In all the figures, 1 is the bearing supporting the right hand end of the pendulum shaft and 1' is the centre for the angular deviation allowed by the bearing. In Figs. 1, 3 and 5, 2 denotes an external roller track which is conical and the cone vertex of which is indicated by 2'. In Figs. 2, 4 and 6, 3 denotes an internal roller track which is conical and the cone vertex of which is indicated by 3'. All the roller tracks 2 and 3 respectively are rigidly connected to and coaxial with the bearing 1, and in all the figures, 4 is the common central axis of the roller track and bearing. In Figs. 1, 3 and 5, 5 denotes the roller body on the left hand end of the pendulum shaft of the vibrator and the central axis of this roller body is indicated by 5'. In Figs. 2, 4 and 6, the sleeve-shaped roller body is denoted by 6 on the left hand end of the pendulum shaft and the axis of the roller body by 6'. In Figs. 5 and 6 the previously mentioned extension of the roller body is denoted by 7 and 8, respectively. Finally, in all the figures the point of intersection between the rotary or central axes 5' and 6' of the roller body and the common central axis of the roller track and bearing is denoted by 9. This point 9 represents the imaginary oscillation point of the pendulum.

Different cases of operation are encountered, depending upon the flexibility of the pendulum shaft and the effect of the dynamic forces on the various parts of the vibrator pendulum. If the pendulum shaft meets the requirements for theoretical rigidity while the vibrator is functioning, the point of intersection 9 will coincide with the deviation centre 1' of the bearing 1, as shown in Figs. 1 and 2. In the case according to Fig. 1 the axial force in the bearing is directed from the latter towards the roller body 5 since the roller track 2 surrounds the roller body 5, and it is therefore desirable to produce a tendency of the roller body 5 to twist in the direction of the bearing 1 so that the axial force due to the conical form of the roller track is counteracted and substantially eliminated. A twisting tendency of this kind is achieved by causing the gear ratios between the roller body and roller track to vary at axially separated points along the line of contact 10 between the roller body and roller track, while working. The gear ratio is, of course, determined by the diametrical conditions and the roller body always tends to twist in the direction in which the gear ratio decreases, and thus also in the direction in which the ratio between the diameter of the roller body and the diameter of the roller track decreases.

In Fig. 1 therefore, the cone vertex 2' of the roller track 2 is located inside the bearing 1 and the cone vertex of the roller body must, of course, be adapted accordingly to obtain complete contact along the line of contact 10, so that the cone vertex of the roller body will be located at the point 11, that is to say, the point of intersection between the axis 5' of the roller body 5 and the extension of the line 10. Since the roller body must, of course, be adapted in some way or other to the roller track so that a line of contact 10 with a certain axial extension will always be formed, for the sake of simplicity the point at which the cone vertex of the roller body is located will not be specifically mentioned hereafter, since it must be quite obvious that the said point must be placed at the point of intersection between the shaft of the roller body 5' or 6' and the extension of the line of contact 10. The important thing is instead to establish that the line of contact 10 intersects the axis of the roller track and bearing, at what is here referred to as the cone vertex 2' of the roller track, and that this point 2' is axially displaced in relation to the oscillation centre 9 of the pendulum in a direction corresponding to the one in which the axial force is set up in the bearing 1 owing to the conical form of the roller track.

In Fig. 2 the roller track 3 is placed inside the roller body 6 so that the axial force in the bearing 1 is in the opposite direction to that in Fig. 1 on account of the conical form of the roller track. It is desirable, therefore, to produce a tendency of the roller body 6 to twist away from the bearing 1 and this is achieved by placing the cone vertex 3' of the roller track outside the oscillation point 9 of the pendulum, reckoned from the roller body. In Fig. 2 this implies that the cone vertex 3' will also be located outside the bearing 1.

If, as in Figs. 3 and 4, the pendulum shaft is subjected to dynamic deflection, it is clear that the oscillation point 9 of the pendulum will be located somewhat outside the bearing 1, reckoned from the roller body. On account of this fact, as may be seen from Fig. 3 in which the vibrator has an external roller track 2, the cone vertex 2' of the roller track will be outside the bearing 1 but it will still be located inside the oscillation point 9 of the pendulum. In Fig. 4 again where the vibrator has an internal roller track 3, the cone vertex 3' of the roller track is located outside the oscillation point 9 of the pendulum which in turn is located outside the bearing 1.

In Figs. 5 and 6 the dynamic deflection of the pendulum shaft is somewhat over-compensated by the moment generated by the extension 7 and 8 of the roller body under the influence of the centrifugal force, so that the oscillation point 9 of the pendulum is displaced inwards from the bearing 1. In the case of the external roller track 2 (Fig. 5) the cone vertex 2' of the roller track 2, which here also forms the point of intersection between the line of contact 10 and the common axis 4 for the roller track and bearing, is still located somewhat inside the oscillation point 9. With an internal roller track 3 (Fig. 6), on the other hand, the cone vertex 3' is still located outside the oscillation point 9 of the pendulum but inside the bearing 1, in the case illustrated.

As already mentioned, consideration must be given both to the deflection of the pendulum shaft during normal operation as may be clearly seen from the figures, and also the elastic deformation of the roller body and roller track. Thus in the preceding description of the embodiments diagrammatically shown in the drawing, where reference was made to the cone vertexes of the roller body and roller track, respectively, this must not be interpreted on the basis of the static conditions since the elastic deformation is then extremely slight. Instead, the term must here be regarded as defining something which is only present during normal operation of the vibrator. The cone vertexes 2' and 3' for the roller tracks must therefore be determined starting from the dynamic line of contact 10 between the roller body and the roller track, which is also quite feasible. The line of contact 10 may, of course, be interrupted by intermediate spaces where no contact takes place between the roller body and the roller track and it may also exhibit a certain wave form on technical production grounds, for example, whereby the chief extension of the contact line plays the decisive part. Generally speaking, the total pressure between the roller body and the roller track, which corresponds to a more or less uniformly distributed load, can always be replaced by two equally large, axially separated loads, and the points at which these point loads act on the line of contact must be regarded as forming the initial points for a determination of the variation in the gear ratio in the axial direction of the vibrator.

What I claim is:

1. A conical pendulum type rotary vibrator comprising a rotatable shaft, a bearing supporting the right hand end of the shaft, a roller body on the left hand end of the shaft, a conical roller track positioned substantially coaxially with and tapering towards the bearing, a conical inner surface on the roller track, a conical outer surface on the roller body having a line contact with the conical inner surface of the roller track under operative conditions so that the roller body executes a vibration producing planetary movement around the roller track axis when rotated by the shaft, the movement of the roller body axis during said planetary movement generating a first cone having its apex on the roller track axis, and the line of contact between the roller body and the roller track forming when extended the generatrix of a second cone having its apex on the roller track axis displaced to the left from the apex of the first cone.

2. A conical pendulum type rotary vibrator comprising a rotatable shaft, a bearing supporting the right hand end of the shaft, a roller body on the left hand end of the shaft, a conical roller track positioned substantially coaxially with and tapering towards the bearing, a conical outer surface on the roller track, a conical inner surface on the roller body having a line contact with the conical outer surface of the roller track under operative conditions so that the roller body executes a vibration producing planetary movement around the roller track axis when rotated by the shaft, the movement of the roller body axis during said planetary movement generating a first cone having its apex on the roller track axis, and the line of contact between the roller body and the roller track forming when extended the generatrix of a second cone having its apex on the roller track axis displaced to the right from the apex of the first cone.

References Cited in the file of this patent

UNITED STATES PATENTS

| 2,194,410 | Svenson | Mar. 19, 1940 |
| 2,437,983 | Wenander | Mar. 16, 1448 |
| 2,480,825 | Adolph | Sept. 6, 1949 |
| 2,546,806 | Wenander | Mar. 27, 1951 |